Aug. 20, 1968            A. R. BIEDESS            3,397,651
            MEANS FOR STEERING AN UNATTENDED
                VEHICLE ALONG A TRENCH
Filed April 25, 1966                       3 Sheets-Sheet 3
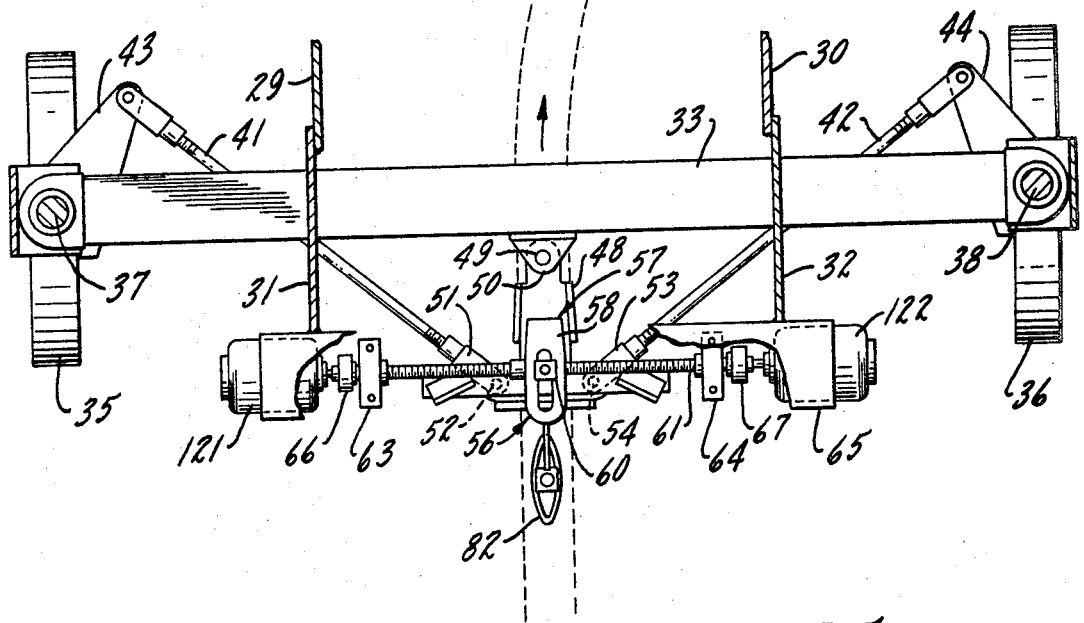
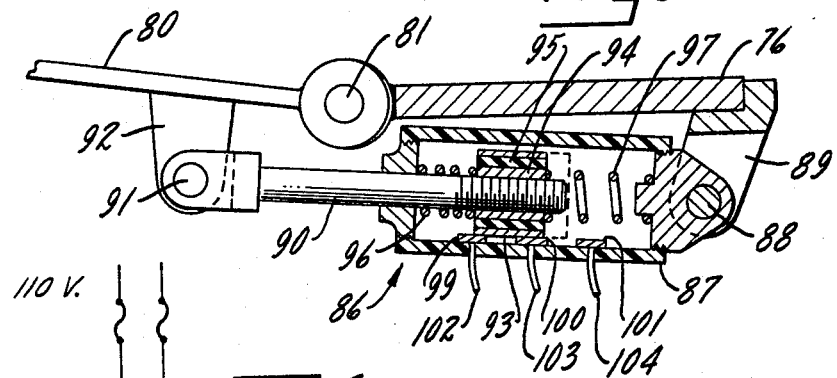
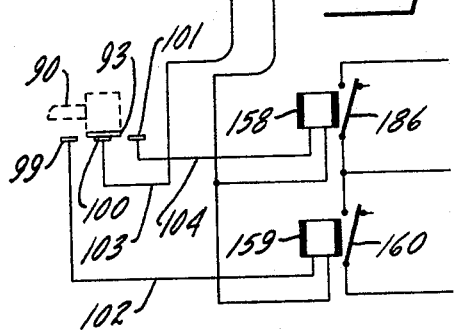
INVENTOR.
Anthony R. Biedess,
BY Parker & Carter
Attorneys.

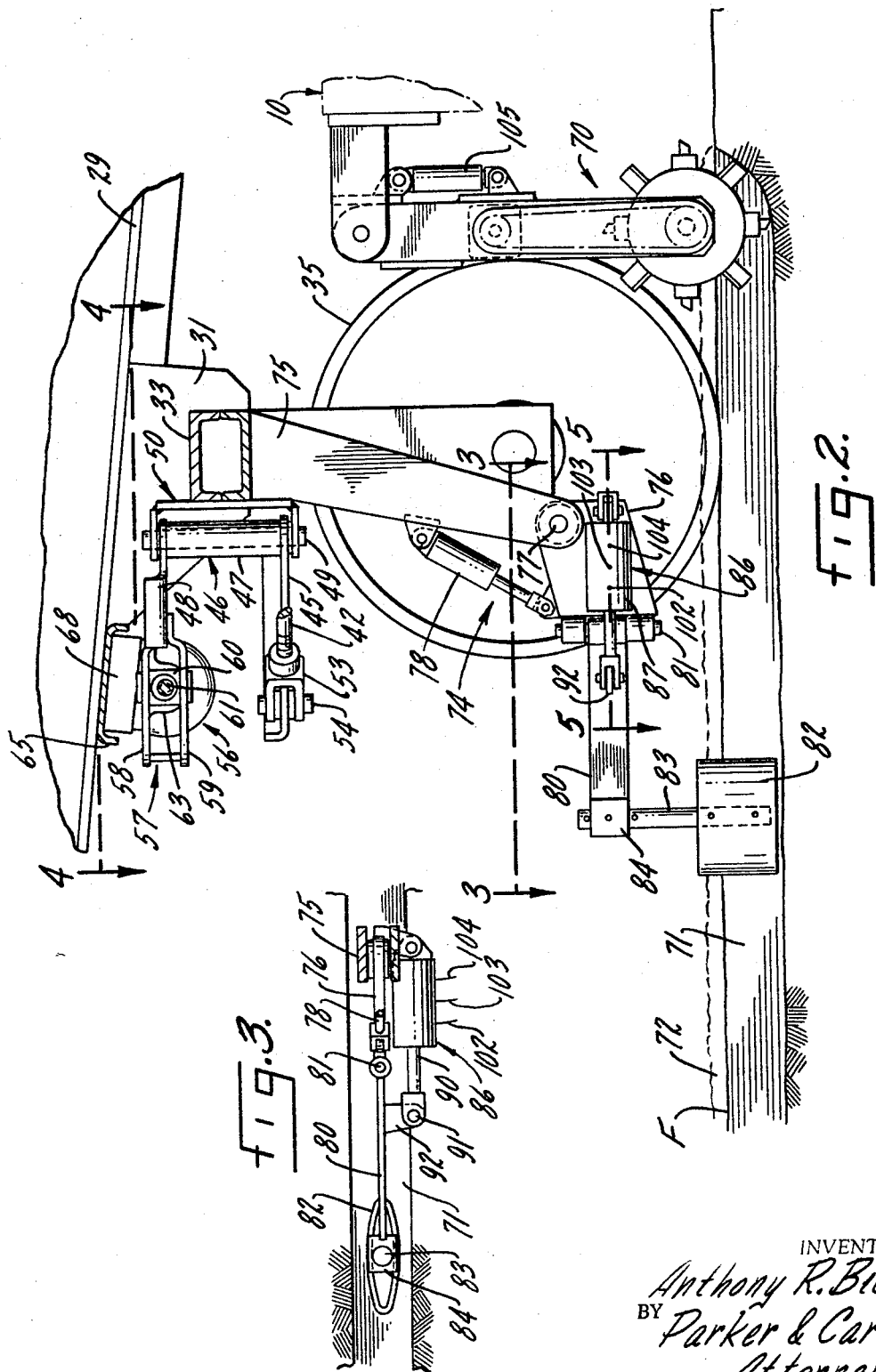

United States Patent Office 3,397,651
Patented Aug. 20, 1968

3,397,651
MEANS FOR STEERING AN UNATTENDED VEHICLE ALONG A TRENCH
Anthony R. Biedess, Chicago, Ill., assignor to Westinghouse Air Brake Company, Pittsburgh, Pa., a corporation of Pennsylvania
Filed Apr. 25, 1966, Ser. No. 544,978
4 Claims. (Cl. 104—244.1)

ABSTRACT OF THE DISCLOSURE

An apparatus for steering a conveyor unit along a course defined by a trench and having a follower assembly pivotably attached to the conveyor unit for engaging and following the trench and a switch which opens and closes a first and second circuit in response to relative movement between the conveyor unit and the follower assembly. The first and second circuits control clutches operative to engage steering motors with a steering screw.

This invention relates to a method and apparatus for steering movable vehicles of the type shown in Patent No. 3,268,058 assigned to the assignee of this application, and more particularly to sensing means adapted to monitor the relative position between a trench and the vehicle and automatically effect steering of the vehicle therealong.

By reference to the aforesaid patent it will be noted that the invention there described includes a plurality of self tramming articulately connected conveyor units each of which has a steering mechanism. The assembly is steered along a linear path by means of a steering system which includes a guide wire laid upon a reference surface, such as the ground, along a desired course of travel, and an electronic system capable of actuating the steering mechanism of each conveyor unit upon reception of a signal generated by the guide wire. By reference to FIGURE 8 of the aforesaid patent it will be noted that steering clutch coil 120 or 151 will be energized, thereby actuating the steering mechanism, depending upon whether switch 186 or 160 respectively is closed. The closure of switches 160 and 186 is dependent in turn upon operation of an electronic signal sensing circuit 130. Specifically, relative displacement of the signal generating means to one side or the other of the guide wire will energize coils 158 or 159 which in turn controls switches 186 and 160.

The electronic signal method of actuating the steering mechanism as described in the aforesaid patent is one mode of actuating the steering leakage. The present application discloses another system for steering the articulated multiunit conveyor shown in the patent. The present invention contemplates means for sensing the desired course by mechanical rather than electrical means, the sensing mechanism thereafter functioning to actuate the proper clutch coil 120 or 151 in the same manner as shown in the aforesaid patent.

Accordingly a primary object is to provide a method and apparatus for automatically steering an operatorless vehicle along a predetermined course.

Yet another object is to provide a method and apparatus for steering a multiunit, wheeled articulated vehicle assembly along a predetermined course.

Yet another object is to provide means for guiding an interconnected multiunit vehicle along a predetermined path which may be linear or non-linear, each unit of said multiunit vehicle being steerable independently of every other unit.

A further object is to provide direction sensing and guidance means for a vehicle as above described which is positive in operation, extremely rugged, easily maintained, and relatively inexpensive.

Other objects and advantages will become apparent from the following description of the invention.

The invention is illustrated more or less diagrammatically in the accompanying figures wherein:

FIGURE 2 is a vertical sectional view to an enlarged scale showing the present invention as applied to the lead unit of the multiunit sinuous conveyor of FIGURE 1;

FIGURE 3 is a detail view taken substantially along the line 3—3 of FIGURE 2;

FIGURE 4 is a view taken substantially along the line 4—4 of FIGURE 2 with parts broken away and others omitted for clarity;

FIGURE 5 is a view to an enlarged scale taken substantially along the line 5—5 of FIGURE 2; and FIGURE 6 is an exemplary wiring diagram.

Like reference numerals will be used to refer to like parts throughout the following description of the drawings.

Figure 1:
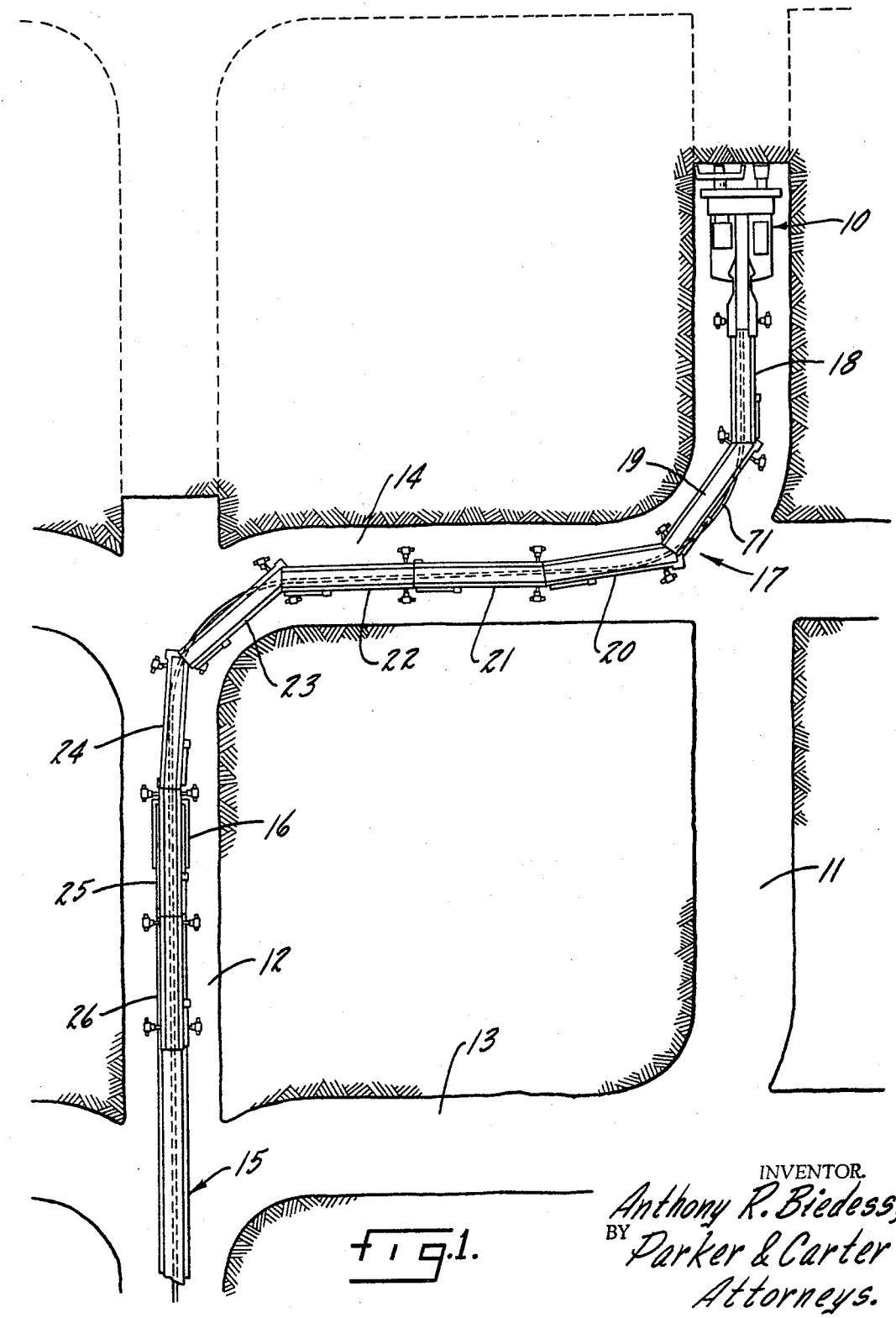
FIGURE 1 is a top plan view, somewhat diagrammatic in nature, of an operatorless self-propelled, self-steerable sinuous conveyor which includes this invention, said conveyor being shown operating in a multi-entry continuous mining system.

A continuous miner is indicated at 10 in FIGURE 1. The miner is shown working in an underground coal mine which consists of a series of generally parallel entries 11 and 12 and a series of crosscuts 13 and 14. A mother conveyor is indicated generally at 15 in entry 12, the tail or loading end of the conveyor being indicated at 16.

A sinuous self powered steerable conveyor is indicated generally at 17. The conveyor consists essentially of a lead unit 18, a series of intermediate units 19–25, and a trailing unit 26. Units 18 through 25 are substantially identical, one to the other. Trailing or discharge unit 26 differs from the preceding units primarily by the addition of a second set of wheels.

Reference is now made to FIGURES 2 through 5.

A pair of side frame members 29, 30 of a typical unit in the conveyor 17 are indicated in FIGURES 2 and 4. These members are welded at one end to gusset plates 31 and 32 respectively, the gusset plates in turn being welded to a box frame 33. A pair of steerable wheels 35, 36 are located at the ends of box frame 33, each wheel being connected to the box frame by a shaft assembly 37 or 38, the details of which are not necessary to an understanding of the present invention.

Wheels 35 and 36 are simultaneously turned by the mechanism shown best in FIGURES 2 and 4. The steering mechanism includes a pair of drag links 41, 42, each of which is pivotally connected at its outer end to an associated tie plate 43 or 44 and at its inner end to the lower arm 45 of a yoke assembly 46. The yoke assembly 46 includes a tubular bight portion 47 and an upper arm 48. The steering yoke assembly 46 is connected to box frame 33 by pin 49 which passes through the tubular bight 47 and is received in the forwardly directed arms of a support bracket 50 which is welded to the box frame.

A clevis is carried by the inner end of each drag link 41, 42. Clevis 51 is pivotally connected to lower yoke arm 45 at 52, and clevis 53 is pivotally connected to lower yoke arm 45 by pin 54. It will be apparent that as the yoke assembly 46 pivots about pin 49, the wheel assemblies will be simultaneously turned in the same general turning direction. By suitable proportioning of the drag links and tie plates, skew of the wheels can be accommodated in a manner well known in the art.

The mechanical means for pivoting yoke assembly 46 about pin 49 is illustrated best in FIGURES 2 and 4.

The upper yoke arm 48 carries a steering knuckle assembly 56 which consists of a bracket 57 whose upper and lower arms 58, 59, respectively, are welded to yoke arm 48. A ball screw adaptor 60 is slidably mounted in slots in the upper and lower arms 58, 59 of bracket 57. The adaptor 60 receives a ball screw 61 which for purposes of description may be considered to have a right hand thread extending its entire length and may, for example, be identical in construction to the structure shown in the aforesaid patent. As yoke assembly 46 pilots about pin 49 wheel assemblies 35, 36 will be turned along with drag links 41, 42 and tie plates 43, 44.

Ball screw 61 is journaled at its ends in suitable bearings 63, 64. The bearings are supported in any suitable manner, such as by bolts and a suspension bracket which in turn is welded or otherwise suitably secured to a transverse member 65 which is integral with the frame of the unit. As best seen in FIGURES 2 and 4, frame member 65 is welded to the rearward or trailing edge of gusset plates 31 and 32.

The left end of ball screw 61 is received in magnetic clutch 66, and the right end of the ball screw is received in magnetic clutch 67. The output shaft of clutch or steering motor 121 extends into the outer half of clutch 66, and the output shaft of steering motor 122 extends into the outer half of magnetic clutch 67. The motors are secured to transverse member 65 by brackets 68 as best seen in FIGURE 2.

Clutch 66 includes therewithin a coil identical in all respects to coil 120 of the aforesaid patent, and clutch 67 includes therewithin a coil which is likewise identical in all respects with coil 151 of the aforesaid patent. This invention is particularly concerned wtih means for automatically controlling the operation of either clutch motor 121 or 122 in a manner to cause the unit to follow a predetermined course. The means for accomplishing this purpose may be specifically described as follows:

A trenching device is indicated generally at 70 in FIGURE 2. The device is shown connected to the rear of continuous miner 10 in such fashion as to be swingable upwardly from the illustrated position to accommodate backing movements of the miner. In this instance trenching device 70 is connected to the midpoint of the miner and functions to cut a trench 71 in the floor F of the coal mine. The spoil cut out by the trenching device is indicated at 72. Although the trenching device has been shown as connected to the miner, it will be obvious that it could be connected to other carrying apparatus, for example the lead unit of the multiunit conveyor, and arranged for engagement with any convenient reference surface. For purposes of convenience it has been shown as mounted for operation in conjunction with the Floor F as a reference surface.

A follower assembly indicated generally at 74 depends from the box frame 33 of the conveyor unit and cooperates with the trench cut by the trenching device 70 to actuate the steering mechanism above described. A detailed description of assembly 74 follows.

A rigid bracket 75 is welded to and extends downwardly from the underside of box frame 33. A switch plate is indicated at 76, the switch plate being pivotally connected to bracket 75 by pin 77. A cylinder assembly 78 is connected at its ends to bracket 75 and switch plate 76 and releasably holds the switch plate in the illustrated position. It may be employed to retract the follower arm 80 by any suitable means.

A follower arm 80 is pivotally connected to switch plate 76 by pivot pin 81. A shoe or follower assembly which includes a follower 82 and a shaft 83 extend downwardly from the trailing end of arm 80, the shaft being vertically adjustable within a sleeve 84 by any suitable adjusting means.

A direction sensing feeler switch assembly is indicated generally at 86. Said assembly includes a switch housing 87 which is pivotally connected at its forward end by pin 88 to a bracket 89 which in turn is welded to switch plate 76. Rod 90 which extends outwardly from the rear end of housing 87 is pivotally connected by a clevis and pin 91 to bracket 92 carried by follower arm 80.

The inner, threaded end of rod 90 carries a contact sleeve 93. Sleeve 93 is electrically insulated from rod 90 and its threade receptacle 94 by an insulating ring 95. A pair of springs 96, 97 are disposed on either side of contact sleeve member 93 and biased to urged the sleeve into a centered position within housing 87.

Three contact plates are indicated at 99, 100 and 101, each being arranged for sliding engagement with contact sleeve 93. Three leads 102, 103 and 104 are connected, respectively, to contact plates 99, 100 and 101.

The use and operation of the invention are as follows:

As miner 10 advances forwardly, that is to the right as viewed in FIGURE 2, trenching device 70 cuts a trench 71 in the floor of the coal mine. So long as trench 71 is linear in a horizontal plane, or the vertical projection of the trench is linear in a horizontal plane, follower 82 and follower arm 80 will be oriented in the solid line position of FIGURE 4. That is, the follower arm 80 will be parallel, and in this instance, coincident with the predetermined path of travel represented by the center line trench 71. In this condition contact sleeve 93 will be in contact only with contact plate 100 as best seen in FIGURE 6. In this condition, circuits 102 and 104 are open and accordingly switches 160 and 186 are open. The coils within clutches 66 and 67 are therefore deenergized and ball screw 61 is stationary, even though steering motors 121 and 122 may be running. So long as the ball screw 61 does not turn, drag links 41 and 42 will be stationary and the wheel assemblies 35, 36 will remain in their centered, FIGURE 4 position.

When follower 82 contacts a vertical side edge of trench 71 by reason of a change of course of the trench, follower arm 80 will be displaced from its centered solid line position of FIGURE 4 to the solid line position of FIGURE 5. Displacement of arm 80 causes rod 90 to move from a centered position of FIGURE 4 to a displaced position represented in FIGURE 5, for example, against the bias of spring 96. When contact sleeve 93 contacts plates 99 and 100, circuit 103, 102 is completed, thus energizing coils 159 and closing switch 160. Closure of switch 160 then energizes the clutch coil associated with the appropriate clutch for connecting the appropriate motor to ball screw 61 and rotating yoke assembly 46 in a direction to cause wheel 35 and 36 to turn in a direction conforming to the change direction of trench 71. As the wheels turn follower arm 80 will return to its centered, dotted line position of FIGURE 5, thereby breaking the contact between plates 99 and 100 and opening switch 160 which deenergizes the clutch steering coil.

It will be understood, having in mind the foregoing description and the disclosure of Patent No. 3,268,058 assigned to the assignee of this application, that it will be within the abilities of a marker skilled in the art to make appropriate modifications which enable the system to operate when the conveyor moves in a rearward as well as a forward direction. To this end the follower 82 is preferably smoothly contoured at each end to prevent catching on the edge of trench 71. Likewise, trencher 70 includes a retraction cylinder arrangement 105 which, when extended, swings the trencher upwardly out of contact with the floor F. Operation of retraction cylinder 105 can be controlled from the operator station of miner 10.

It will be seen that mechanism 74 consists essentially of a sensing means or sensor which is maintained in sensing relationship to the trench or reference depression 71. Mechanism 74 senses a change in the relationship of the reference depression with respect to the direction of movement of conveyor unit 18 whenever follower 82 strikes a vertical edge of trench 71. When contact between follower 82 and the edge of trench 71 is made, a control signal is generated by virtue of completion of either circuit 102 or 104 depending upon whether contact sleeve 93 contacts plates 99 and 100, or 100 and 101. This control signal closes the appropriate one of switches 160 and 186 which actuates the steering mechanism and causes it to operate in a direction to reestablish the relationship between the reference depression and the movable unit. When the preexisting relationship is reestablished contact sleeve 93 will have returned to its centered dotted line position of FIGURE 5, and either circuit 102 or 104 broken which thereby terminates the control signal generated by closure of either of switches 160 and 186.

Although a follower mechanism which functions by virtue of physical contact with a reference depression has been shown and described, it will be understood that it is within the scope of the invention to employ an equivalent means for sensing a change in the relationship of the reference depression with respect to the direction of movement of the vehicle, such as a pressure sensing arrangement utilizing compressed air which is directed against the vertical walls of the trench.

Likewise it will be understood that the reference depression may be formed in any convenient reference surface, the particular surface here shown, namely the floor F of the coal mine, being shown for convenience only. By suitable reproportioning of the components the reference depression could be formed overhead or along a sidewall if operating conditions so require.

Although a preferred embodiment of the invention has been illustrated and described it will be apparent to those skilled in the art that other modifications may be made within the spirit and scope of the invention. Accordingly it is intended that the scope of the invention be limited not by the scope of the aforegoing description but solely by the hereinafter appended claims.

I claim:

1. An apparatus for automatically steering a vehicle along a course defined by a trench having sidewalls, said apparatus including, in combination,
   follower means pivotally secured to said vehicle and positionable within said trench for engaging said trench sidewalls and following the course of said trench,
   switch means responsive to the relative positions of said follower means and said vehicle for opening and closing a first circuit and a second circuit,
   at least one ground engaging turnable steering wheel secured to said vehicle, and
   means responsive to the opening and closing of said first circuit and said second circuit for turning each steering wheel in a direction effective to cause the vehicle to follow the course of said trench.

2. The structure of claim 1 further characterized in that said switch means includes,
   a tubular housing pivotably secured at one end to said vehicle,
   a piston slidably housed in said tubular housing,
   a rod secured to said piston at one end and pivotably attached at its other end to said follower means,
   first, second, and third contact plates secured within said tubular housing in spaced axial relationship, with
   said piston having a peripheral sleeve adapted to engage and form a conductive path between said first and said second contacts and between said second and said third contacts.

3. The structure of claim 2 further characterized by and including means to yieldingly urge said piston into exclusive contact with said second contact plate.

4. A control system for coupling and uncoupling a steering linkage actuating clutch of a vehicle so that said vehicle will follow a course defined by a trench formed in the supporting surface, said control system comprising:
   circuit means for energizing and deenergizing a steering linkage actuating clutch coil,
   follower means secured to said vehicle for engaging and following said trench, with
   said circuit means including switch means operatively secured between said follower means and said vehicle and responsive to relative motion therebetween to open and close said circuit means and thereby couple and uncouple the steering linkage actuating clutch.

References Cited

UNITED STATES PATENTS

| 3,128,840 | 4/1962 | Barrett | 180—77 |
| 3,268,058 | 8/1966 | Buckeridge et al. | 180—79.1 |
| 3,301,602 | 1/1967 | Heimaster et al. | 299—64 |
| 3,322,465 | 5/1967 | Crom et al. | 299—1 |

FOREIGN PATENTS

| 832,741 | 4/1960 | Great Britain. |

ERNEST R. PURSER, *Primary Examiner.*